Patented Feb. 26, 1946

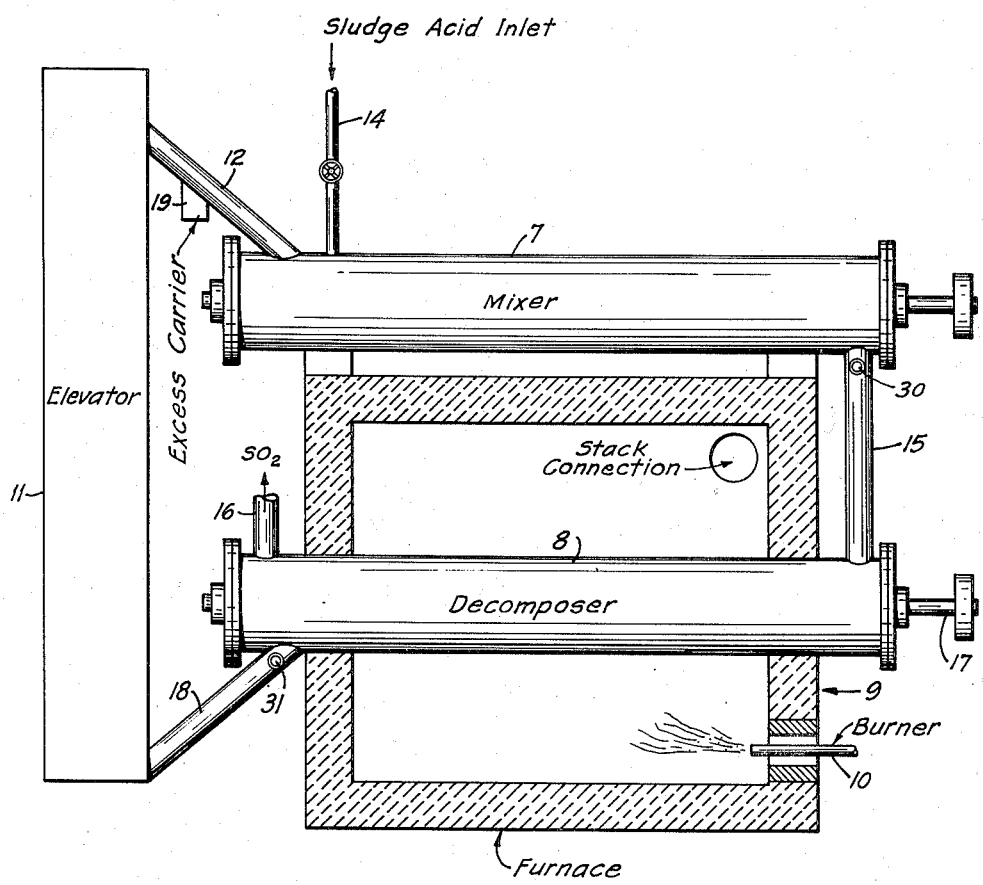

2,395,503

UNITED STATES PATENT OFFICE 2,395,503

PROCESS FOR TREATING ACID SLUDGE

Earl T. Ross, Los Angeles, and Cecil B. Wilde, Compton, Calif., assignors to Stauffer Chemical Company, a corporation of California Application April 3, 1945, Serial No. 586,374

15 Claims. (Cl. 23—173)

This invention relates to a process for the recovery of sulphur dioxide from the sulphur values contained in acid sludge derived from the treatment of hydrocarbons with sulphuric acid.

Sulphuric acid is employed industrially in various operations in which it becomes contaminated with organic materials containing hydrogen. A great deal of such contaminated acid results from certain operations in the petroleum industry. Such contaminated acid will range in composition between 20 per cent and about 90 per cent in sulphuric acid content and from over 60 per cent to only a fraction of a per cent in hydrocarbon content. Acid sludge is designated by various names such as alcohol spent acid, alkylation sludge acid, pressure distillate sludge acid, lube oil sludge acid, naphtha sludge, et cetera, depending upon its source.

Various methods have been used to reclaim acid sludge, such as dilution followed by separation of the resulting acid and hydrocarbon layers, and the concentration of the weak acid so separated. These methods are not wholly satisfactory because concentration of weak acid is troublesome and costly and because nearly valueless waste materials, such as acid saturated oil, tar, or coke, are formed as by-products.

To avoid these difficulties later processes were developed for the thermal decomposition of the sulphuric acid in sludges with the formation of sulphur dioxide which could be freed of undesirable impurities and converted anew into fresh sulphuric acid by any of the well-known processes.

Such thermal decomposition is based upon the fact that sulphuric acid can be reduced by hydrogen with the formation of sulphur dioxide and water, or by carbon with the formation of sulphur dioxide, carbon dioxide and water. The hydrogen and the carbon, of course, may be, and usually are, present in the same molecule. Whether reduction be by hydrogen, by carbon, or by both, the reaction is endothermic and therefore requires heat input. Such heat input has been accomplished by bringing the acid sludge into direct contact with hot combustion gases, the heat of which partly decomposes the acid sludge into water and sulphur dioxide, at the same time usually causing the combustion of considerable portions of the hydrocarbons present. A typical process of this nature is described in Heckenbleikner Patent 1,953,225.

Mixing of the decomposition products of the acid sludge with the combustion gases results in a gas containing a relatively small quantity of sulphur dioxide and larger quantities of other gases such as carbon dioxide, carbon monoxide and hydrocarbon vapors. These processes, of which the aforementioned Heckenbleikner patent is typical, require a relatively high temperature in the combustion chamber; they are difficult to control in such a manner as to ensure that excessive quantities of hydrocarbons are not volatilized without combustion, that the sulphur dioxide content is not too low to permit of the subsequent use of such sulphur dioxide as for example in the manufacture of sulphuric acid, or to avoid the formation of excessive amounts of coke or carbon in the combustion chamber.

According to Rumple and to Bartholomew (Patents 2,028,725 and 2,028,713), this typical Heckenbleikner process was limited in application to sludges of low oil content. For high oil content sludges, those most frequently encountered in refinery practice, Rumple and Bartholomew at first proposed the addition to the sludge of solids sufficient in mass and temperature to supply all the heat required to decompose the sludge. Because the solids necessarily were at quite elevated temperatures (1500° F.), objectionable oil distillation and hydrocarbon cracking ensued. To obviate this, Bartholomew later proposed (Patent 2,049,243) an oil distillation prior to decomposition while Barnes (2,223,934) suggested a special furnace construction enabling delayed mixing of the sludge and solids, as Barnes states, "so that the heat of the solids is transmitted to the acid sludge without substantial admixture of the stream of solids with the sludge." From this it should be obvious that prior to this invention a single process has not been available capable of handling with equal facility all acid sludges, irrespective of composition and over the wide range of acid content and hydrocarbon content encountered in an industrial plant operation and identified as acid sludge.

Heretofore, it has been necessary to design and build the sludge decomposition plant to suit a particular range of sludges and so long as sludges within that range were provided, the plant could be operated. If and when it became necessary to use a sludge having a materially different acid or hydrocarbon content, another type of sludge decomposition plant was required. No single process or plant could satisfactorily handle all sludges although some effort was made to this end by attempts to distill the oil from high oil sludges and by blending various sludges or a waste acid and a sludge; this practice is obviously an attempted makeshift and is unsuited to wide application.

In investigating the subject we have observed that if a volume of an acid sludge be heated alone and indirectly to the temperature of decomposition, violent frothing and foaming takes place and semi-plastic carbonaceous compounds are formed which subsequently harden as masses of coke of a sponge or honeycomb structure without complete decomposition of the sulphuric acid. The same results follow if a high oil sludge is heated with a hot solid as in the aforementioned Rumple and Bartholomew patents. In order substantially to complete the decomposition of the sulphuric acid, which exists in the inside of the sponge-like masses of coke, it is necessary that the masses be crushed, as by means of iron bars or balls in a rotary kiln, or that they be heated to a relatively high temperature in order to force heat into their interiors. The undesirability of the formation of such masses has been recognized and means described for avoiding it in the literature.

We have succeeded in developing a successful process based upon the discovery by us that if acid sludge be mixed, at a temperature below that of active decomposition, with granular coke, diatomaceous earth, the carbonaceous residue produced in the process or other suitable carrier in sufficient volume and upon which the acid sludge may be distributed in the form of a thin layer, coating, or film, subsequent heating of the mixture to only a moderate temperature for a relatively short period of time produces substantially complete decomposition of the acid sludge without excessive frothing and foaming and without the formation of the undesirable masses of sponge-like coke requiring heating to a high temperature. We have further discovered that if air be substantially excluded from the reaction chamber during the decomposition process, the decomposition of the acid sludge will result in the production of a gas which, on a dry basis, may contain as much as 96 per cent sulphur dioxide, by volume, while at the same time the residue of the decomposition reaction is a coke low in acid.

Foaming and swelling occur when temperature of the components, the acid sludge and the carrier, are such that the temperature of the resulting mixture is at or near the temperature of active decomposition. For this reason we consider it important to our invention that both carrier and acid be at relatively low temperatures when mixed. For example, we consider 500° F. the maximum desirable temperature of the carrier before mixing, and from 150° F. to 300° F. as being the optimum temperature range for the mixture with 325° F. as a maximum temperature for the acid sludge and carrier after mixing.

In developing this method we have discovered, for example, that as little as two parts by weight of dry carrier will act as a carrier for one part by weight of acid sludge and that, within a few minutes, after mixing, this mixture becomes sufficiently free flowing to permit of its handling in mechanical equipment, as, for example, in a screw conveyor. Although we have mentioned two parts of carrier, we do not wish to limit ourselves to this and one can use larger ratios of the carrier to sludge. As will presently appear, the quantity of carrier employed is in part related to the size and type of apparatus utilized while the quantity of sludge acid is determined in part by the heat transfer characteristics of the apparatus. We have used carrier-sludge ratios of 2 to 1, 5 to 1 and as high as 20 to 1. One should provide sufficient carrier to ensure adequate contact with or heat reception from the wall through which the heat transfer occurs. At the lower ratios, the carrier must be sufficient to the end that the sludge is distributed as a film on the individual discrete carrier particles.

As a carrier one can use coke breeze, sand, coke, quartz, charcoal or diatomaceous earth. During the operation, these became coated with a film of a carbonaceous residue. If the carrier is recycled, the identity of the original carrier is soon lost for, as we have said, the carrier becomes coated with a carbonaceous residue and usually it is necessary to discard some carrier due to formation of the coke-like residue in the process.

We prefer to use this residue as the carrier and to recycle since by recycling, the heat present in the carrier is not all lost and to this extent certain fuel economies are effected and since the carrier contains carbon produced in the presence of sulphuric acid. Because of this, the carrier possesses a residual or latent activity analogous to that of an active vegetable char. It may be readily activated by any of the usual activation steps such as a high temperature steam treatment. To what extent this activity assists in the acid decomposition we cannot now say; it can assist, however, and we therefore wish to call attention to it. As we have said, however, the practice of the invention is not limited to utilization of the coke-like carrier produced in the process although this is preferred.

If the carrier is recycled, the operation and apparatus employed in a given instance usually result in a product varying in size from wheat grains to fine sea sand. Initially the carrier should preferably not be so coarse that heat transfer into the carrier particles requires too great a length of time. We prefer a carrier all particles of which will pass a 4-mesh screen but the carrier size is not limited to this as we have indicated.

When the carrier is returned a temperature drop of the order of 150° F.–200° F. occurs upon mixing with the sludge. Thus if the decomposition temperature is of the order of 500° F., the issuing carrier will be at this temperature. After mixing this carrier with sludge, the mixture temperature will be of the order of 300° F. If the carrier issues at a temperature of the order of 350° F. the temperature of the mixture will be of the order of 150° F.–200° F. If the carrier issues at a temperature above 500° F., cooling of the carrier may be necessary before the carrier is mixed with the sludge.

We consider it important to our invention, as we have said, that both carrier and acid be at such temperatures when mixed that during mixing decomposition does not take place to an extent sufficient to cause foaming and swelling in the mass. Since the acid sludge is usually at about a normal atmospheric temperature, use of a relatively cold carrier will not result in excessively active decomposition of the sludge during mixing. This will be the situation when the carrier is used but once in the process and a portion or all of it is not recycled. If, however, a portion or all of the carrier is returned directly for mixing with a resulting heat economy, then attention must be given, as we have said, to the temperature of the carrier and the temperature attained during mixing.

In carrying out this process we have discovered that although many of the acid sludges, with which this invention is concerned, begin to decompose with the formation of sulphur dioxide and water at temperatures lower than 600° F. substantially complete decomposition, say 96 per cent to 99 percent, is effected with any of them at this temperature in a short period of time, when processed according to our invention. The temperature to which the mixture should be heated after mixing should be sufficiently high to ensure that the sulphuric acid present is substantially completely decomposed. We have found the temperature required for decomposition of, say, 96 per cent to 99 per cent of the sulphuric acid to vary widely with the type and hydrocarbon content of the sludge acid being decomposed. For example, with a sludge containing 60% or more hydrocarbons, such decomposition may be obtained by our process at a temperature of 340° F.-350° F., while with a sludge containing 3% or less of hydrocarbons a temperature of 580° F. to 600° F. may be required.

We consider our successful operation at these relatively low temperatures to be due to the fact that by our process heat transfer takes place over a very large surface composed of an exceedingly thin film of sludge acid. The temperature variation noted we consider to be due to the fact that below about 340° F. substantially all reduction is accomplished by reaction of sulphuric acid with hydrogen, whereas above that temperature reduction by carbon becomes increasingly effective with temperature increase in our range. As a result those sludges containing a large excess of hydrogen, as hydrocarbons, may be completely decomposed before the carbon reaction becomes important, at temperatures of 340° F.-350° F., while sludges low in hydrocarbon content, and hence dependent upon reduction by carbon, require heating to higher temperatures, 580° F.-600° F., in order that decomposition be substantially complete in the same length of time required for hydrogen-adequate sludges. We do not wish to infer that one need only use these relatively low temperatures.

We have found them normally satisfactory in our process but since the reactions involved are endothermic, it is obvious that higher temperatures will effect decomposition equally well and such higher temperatures may be used if desired. The feature of our process is that because the acid sludge is carried as a film on a carrier, it is possible to effect its decomposition by means of much lower temperatures than have been possible heretofore.

It is a feature of our process that the gas evolved upon the heating of the acid sludge is very high in sulphur dioxide. For example, we have, as noted above, successfully produced gases containing up to 96 per cent sulphur dioxide, by volume, dry basis. Because the gas made by our process is so rich in sulphur dioxide, it is possible to obtain many advantages in the subsequent processing of such gas, as for example in the production of liquid sulphur dioxide or in gas purification for the production of sulphuric acid. Obviously the advantages lie in smaller and less complicated equipment required for processing a high strength gas as compared to that required for a larger volume of more dilute gas.

It is a further feature of our process that it is possible to treat successfully acid sludge varying widely in sulphuric acid and/or hydrocarbon content. For example, we have successfully treated acid sludges containing from 40 per cent to 93 per cent sulphuric acid and from 6 per cent to 50 per cent hydrocarbons in the same equipment without any change whatsoever except those adjustments necessary to handle the different rates of liquid and gas flow attendant up and following the change from one acid sludge to one of a different composition.

The invention includes other objects and features of advantage, some of which, together with the foregoing, will appear hereinafter wherein we have disclosed by way of example a preferred manner of practising our invention on a typical alkylation acid sludge. The drawing accompanying and forming a part hereof is a side elevation, partly in section, of a suitable apparatus for the practice of our invention.

The apparatus required is quite simple and is readily provided. As will be seen from the drawing, only three essential units are required, a carrier-sludge mixer 7, a decomposer 8, and means for heating the decomposer, the furnace 9 and burner 10. In case the carrier is recycled, a return elevator 11 is required.

Mixer 7 receives carrier through chute 12 and any sludge or mixture of sludges through pipe 14 at one end and discharges at its other end, the carrier filmed with sludge into pipe 15. For convenience, the mixer is usually mounted on top of the furnace, pipe 15 leading directly to one end of the decomposer 8. A gas outlet 16 from the decomposer is provided. A shaft 17 extends through the decomposer and carries a ribbon screw conveyor flight (not shown). Both the screw and the mixer are driven in a suitable timed relationship, the means for this being omitted. The substantially acid free carrier is taken off at the other end of the decomposer through pipe 18 which is shown as leading to elevator 11 from which an excess carrier outlet 19 is provided for any quantity of carrier not required in the decomposer operation.

A thermocouple was placed as at 30 in pipe 15 in such a position that the mixture from the mixer fell on and passed about it as the mixture issued from the mixer. The temperature of the acid sludge-carrier mixture was taken by means of a thermocouple so located. Another thermocouple was positioned as at 40 in pipe 18 so that the carrier issuing from the decomposer passed over and about it. The finishing temperature of the carrier was taken with the thermocouple.

The apparatus shown has been employed successfully. However, any suitable mixer can be used and for decomposing the acid, when present as a film, any type of heating device can be utilized such as a drag conveyor, a Mannheim or a Herreshoff furnace. In the decomposer, the sludge-carrier mixture is heated to effect the decomposition of the acid, the temperature being such that the carrier issuing from the furnace carries no more undecomposed acid than is desired. The quantity of acid present is usually expressed as per-cent sulphuric acid; in fact, however, the sulphur is probably present in various combinations and not alone as undecomposed acid. If the carrier is returned and is recycled, it is generally desirable to lag pipe 18, the elevator casing and chute 12 with heat insulating material to avoid condensation and its attendant corrosion.

With high oil sludges (60-70%) the temperature of the issuing carrier is usually about 340°-350° F. When this is returned and is mixed with additional sludge, the temperature of the mixture will be about 200° F. With a low oil or hydrocarbon sludge (2-3%), the carrier issues at a temperature of about 480°-500° F. In case it is desired to produce an acid free carrier or if for any other reason the carrier is at too high a temperature, heat can be removed readily, usually merely by exposing the elevator casing to the atmosphere for a sufficient distance, or the carrier can be cooled by other suitable means, to the end that when the carrier and acid sludge are mixed, active decomposition does not occur.

Although, as noted above, we have obtained a gas from the decomposition of sludge, which gas contained 96% sulphur dioxide, by volume, dry basis, normal operation in commercial equipment produces a gas of 75 to 90% sulphur dioxide, by volume, dry basis. A typical gas analysis taken from a commercial unit now in operation on hydrogen-adequate sludge (average of three successive days) shows the following (all gas percentages are by volume, dry basis):

(Sludge acid feed, 77.7% $H_2SO_4$; finishing temp., 373° F.) (Temp. of exit carrier).

|  | Per cent |
|---|---|
| $SO_2$ | 86.00 |
| $CO_2$ | 7.67 |
| $O_2$ | 1.13 |
| $N_2$, CO, and hyd. carb. | 5.20 (by dif.) |

Carrier-sludge ratio, about 16 to 1.

In the same commercial unit operation on a sludge of insufficient hydrocarbon content to provide enough hydrogen for complete reduction and therefore dependent in part upon carbon reduction gave the following (all gas percentages are by volume, dry basis):

(Sludge acid feed, 86.2% $H_2SO_4$; finishing temp., 450° F.) (Temp. of exit carrier).

|  | Per cent |
|---|---|
| $SO_2$ | 76.6 |
| $CO_2$ | 14.6 |
| $O_2$ | 1.5 |
| $N_2$, CO, and hyd. carb. | 7.3 (by dif.) |

Carrier-sludge ratio, about 20 to 1.

In each case the carbonaceous residue produced was recycled and used as a carrier.

The gases leaving the decomposer can be conditioned for use in a contact plant by any of the well-known methods, such as, for example, cooling directly or indirectly with water or other cooling medium, substantial removal of impurities by electrostatic precipitation and/or filtering, adjusting to the proper sulphur dioxide content for the satisfactory operation of a contact converter by the admission of air or oxygen, and drying the resulting mixture of gases.

The gases leaving the decomposer can also be conditioned for use as a raw material in a liquid sulphur dioxide plant by any of the well-known methods.

The apparatus described can be varied widely to suit the exigencies of any particular installation; one can use one or more decomposer screws or even another type of furnace, such as a Mannheim or a Herreshoff, can be employed. As a fuel, one can use the coke-like residue produced in the process. Depending upon the diameter of the shell and the rate of heat input from the furnace, the ratio of carrier to acid can vary over a wide range. We have used ratios between 2 to 1 and 5 to 1 in one plant and as high as 20 to 1 in another plant wherein the shell 7 was four times the diameter of that in the first plant.

The process can be utilized on any acid sludge or any mixture of these without regard to either their hydrogen, carbon or acid content. The only requirement is that the sludge be fluid sufficiently to move through the pipes, valves and pumps necessary to deliver it for mixing with the carrier.

This is a continuation in part of our applications Serial Numbers 453,242, filed August 1, 1942, and 482,138, filed April 7, 1943.

We claim:

1. A process for treatment of a sulphuric acid sludge comprising mixing one part by weight of the sludge with at least two parts by weight of discrete carrier particles so that the sludge is distributed as a film on the individual particles of the carrier; the temperature of the mixture, during mixing, being below that temperature at which substantial active decomposition of the sludge occurs and, after mixing, being below 325° F.; and thereafter heating the mixture to a temperature whereat the sulphuric acid actively decomposes substantially completely to sulphur dioxide.

2. A process for treatment of a sulphuric acid sludge comprising mixing one part by weight of the sludge with at least two parts by weight of discrete carrier particles so that the sludge is distributed as a film on the individual particles of the carrier; the temperature of the mixture, during mixing, being below that temperature at which substantial active decomposition of the sludge occurs and, after mixing, being below about 325° F.; and thereafter heating the mixture to a temperature between about 340° F. and about 600° F. whereat the sulphuric acid actively decomposes substantially completely to sulphur dioxide.

3. A process for treatment of a sulphuric acid sludge comprising mixing one part by weight of the sludge with at least two parts by weight of discrete carrier particles so that the sludge is distributed as a film on the individual particles of the carrier; the temperature of the mixture, during mixing, being below that temperature at which substantial active decomposition of the sludge occurs and, after mixing, being below about 325° F.; and thereafter heating the mixture indirectly to a temperature whereat the sulphuric acid actively decomposes substantially completely to sulphur dioxide.

4. A process for treatment of a sulphuric acid sludge comprising mixing one part by weight of the sludge with at least two parts by weight of discrete carrier particles so that the sludge is distributed as a film on the individual particles of the carrier; the temperature of the mixture, during mixing, being below that temperature at which substantial active decomposition of the sludge occurs and, after mixing, being below about 325° F.; and thereafter heating the mixture, while continuously agitating the mixture, to a temperature whereat the sulphuric acid is actively decomposed substantially completely to sulphur dioxide.

5. A process for treatment of a sulphuric acid sludge comprising mixing one part by weight of the sludge with at least two parts by weight of discrete carrier particles so that the sludge is distributed as a film on the individual particles of the carrier, the temperature of the resulting mixture, after thorough mixing, being between about 150° F. to about 300° F. and below that temperature at which active decomposition of the sludge occurs; and thereafter heating the mixture to a temperature whereat the sulphuric acid is actively decomposed substantially completely to sulphur dioxide.

6. A process for treatment of a sulphuric acid sludge comprising mixing one part by weight of the sludge with at least two parts by weight of discrete carrier particles so that the sludge is distributed as a film on the individual particles of the carrier, the temperature of the resulting mixture, after thorough mixing, being between about 150° F. to about 300° F. and below that temperature at which active decomposition of the sludge occurs; and thereafter heating the mixture to a temperature between about 340° F. and about 600° whereat the sulphuric acid is actively decomposed substantially completely to sulphur dioxide.

7. A process for treatment of a sulphuric acid sludge comprising mixing one part by weight of the sludge with at least two parts by weight of discrete carrier particles so that the sludge is distributed as a film on the individual particles of the carrier, the temperature of the resulting mixture, after thorough mixing, being between about 150° F. to about 300° F. and below that temperature at which active decomposition of the sludge occurs; and thereafter heating the mixture indirectly, while continuously agitating the mixture, to a temperature between about 340° F. and about 600° F. to actively decompose the sulphuric acid substantially completely to sulphur dioxide.

8. A process for treatment of a sulphuric acid sludge comprising mixing one part by weight of the sludge with at least two parts by weight of discrete carrier particles so that the sludge is distributed as a film on the individual particles of the carrier; the temperature of the mixture, during mixing, being below that temperature at which substantial active decomposition of the sludge occurs and, after mixing, being below about 325° F.; and thereafter indirectly heating the mixture, while continuously agitating the mixture, to a temperature between about 340° F. and about 600° F. whereat the sulphuric acid is actively decomposed substantially completely to sulphur dioxide.

9. A continuous process for producing $SO_2$ from a sulphuric acid sludge comprising mixing one part by weight of the sludge with at least two parts by weight of discrete particles of a solid granular carbonaceous residue previously derived from the process so that the sludge is distributed as a film in the individual particles of the residue, the temperature of the granular solid and of the sludge being such that after mixing the temperature is in the range of about 150° F. to about 300° F., heating the resulting mixture indirectly to a temperature of about 350° F.–500° F. while moving it under substantially continuous agitation through a heating zone wherein the sludge is decomposed with evolution of an $SO_2$ containing gas and said granular residue, removing said granular residue from the heating zone and returning at least a part of said residue to the aforementioned mixing step.

10. A process for treating acid sludge comprising establishing a flowing stream of the sludge, establishing a flowing stream of solid discrete carrier particles, flowing said streams together to mix the two and form a stream of sludge filmed carrier, the rate of feed of the two streams being such that at least two parts by weight of the carrier are mixed with one part by weight of the sludge so that the sludge is distributed as a film on the individual particles of the carrier, the temperature of the two streams prior to mixing being such that substantial active decomposition of the sludge does not occur upon mixing of the two and after mixing the temperature of the sludge filmed carrier stream is below about 325° F., and heating the sludge filmed carrier stream to decompose the acid to sulphur dioxide.

11. A process for treating acid sludge comprising establishing a flowing stream of the sludge, establishing a flowing stream of solid discrete carrier particles including a coke-like residue previously produced in the process, flowing said streams together to mix the two and form a stream of sludge filmed carrier particles, the rate of feed of the two streams being such that at least two parts by weight of the carrier are mixed with one part by weight of the sludge so that the sludge is distributed as a film on the individual particules of the carrier, the temperature of the two streams prior to mixing being such that substantial active decomposition of the sludge does not occur upon mixing of the two and after mixing the temperature of the sludge filmed carrier stream is below about 325° F., heating the sludge filmed carrier stream to decompose the acid to sulphur dioxide and form a coke-like residue which is removed and at least a portion of which is then returned to the carrier particle stream.

12. A continuous process for producing $SO_2$ from a sulphuric acid sludge comprising mixing one part by weight of the sludge with at least two parts by weight of discrete particles of a solid granular carbonaceous residue previously derived from the process so that the sludge is distributed as a film on the individual particles of the residue, the temperature of the granular solid and of the sludge being such that after mixing the temperature is below about 325° F., heating the resulting mixture while moving it under substantially continuous agitation through a heating zone wherein the sludge is decomposed with evolution of an $SO_2$ containing gas and said granular residue, removing said granular residue from the heating zone and returning at least a part of said residue to the aforesaid mixing step.

13. A continuous process for producing $SO_2$ from a sulphuric acid sludge comprising mixing one part by weight of the sludge with at least two parts by weight of discrete particles of a solid granular carbonaceous residue previously derived from the process so that the sludge is distributed as a film on the individual particles of the residue, the temperature of the granular solid and of the sludge being such that after mixing the temperature is in the range of about 150° F. to about 300° F., heating the resulting mixture while moving it under substantially continuous agitation through a heating zone wherein the sludge is heated to a temperature between 340° F. and 600° F. and the sludge is decomposed with evolution of an $SO_2$ containing gas and said granular residue, removing said granular residue from the heating zone and returning at least a part of said residue to the aforesaid mixing step.

14. A continuous process for producing $SO_2$ from a sulphuric acid sludge comprising mixing one part by weight of the sludge with at least two parts by weight of discrete particles of a solid granular carbonaceous residue previously derived from the process so that the sludge is distributed as a film on the individual particles of the residue, the temperature of the granular solid and of the sludge being such that after mixing the temperature is in the range of about 150° F. to about 325° F., heating the resulting mixture in a heating zone wherein the sludge is decomposed with evolution of an $SO_2$ containing gas and said granular residue, removing said granular residue from the heating zone and returning at least a part of said residue to the aforesaid mixing step.

15. A continuous process for producing $SO_2$ from a sulphuric acid sludge comprising mixing one part by weight of the sludge with at least two parts by weight of discrete particles of a solid granular carbonaceous residue previously derived from the process so that the sludge is distributed as a film in the individual particles of the residue, the temperature of the granular solid and of the sludge being such that after mixing the temperature is in the range of about 150° F. to about 325° F., heating the resulting mixture to a temperature between about 340° F. and about 600° F. while moving it through a heating zone wherein the sludge is decomposed with evolution of an $SO_2$ containing gas and said granular residue, removing said granular residue from the heating zone and returning at least a part of said residue to the aforesaid mixing step.

EARL T. ROSS.
CECIL B. WILDE.